US012769056B2

(12) United States Patent
Take et al.

(10) Patent No.: US 12,769,056 B2
(45) Date of Patent: Oct. 20, 2026

(54) OPTICAL DEVICE

(71) Applicant: TDK Corporation, Tokyo (JP)

(72) Inventors: Hiroshi Take, Hong Kong (CN); Kenji Nagase, Hong Kong (CN); Anthony Reymund Melad Binarao, Hong Kong (CN); Cheng Bu Heng, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 279 days.

(21) Appl. No.: 18/620,044

(22) Filed: Mar. 28, 2024

(65) Prior Publication Data

US 2024/0329307 A1 Oct. 3, 2024

(30) Foreign Application Priority Data

Mar. 30, 2023 (CN) ......................... 202310331482.8

(51) Int. Cl.
*G02B 6/122* (2006.01)
*G02B 6/12* (2006.01)

(52) U.S. Cl.
CPC ...... *G02B 6/122* (2013.01); *G02B 2006/1204* (2013.01); *G02B 2006/12045* (2013.01)

(58) Field of Classification Search
None
See application file for complete search history.

(56) References Cited

U.S. PATENT DOCUMENTS 5,862,288 A * 1/1999 Tayag ................ G02B 6/12007 398/79
6,129,864 A * 10/2000 Imaeda .................. G02B 6/136 264/1.24
7,088,875 B2 8/2006 Sugiyama et al.
7,272,279 B2 9/2007 Ishikawa et al.
10,585,328 B2 * 3/2020 Iwatsuka ................ G02B 6/126
11,537,026 B2 12/2022 Zhang et al.
2001/0053262 A1 * 12/2001 Kinoshita .......... G02B 6/29361 385/24

(Continued)

FOREIGN PATENT DOCUMENTS

JP 2006-195383 A 7/2006

OTHER PUBLICATIONS

Desiatov et al.; "Ultra-low-loss integrated visible photonics using thin-film lithium niobate"; Optica; vol. 6; No. 3; Mar. 2019; pp. 380-384.

*Primary Examiner* — Jerry Rahll
(74) *Attorney, Agent, or Firm* — Oliff PLC

(57) ABSTRACT

An optical device includes: a substrate; and at least two optical waveguides formed on the substrate and facing a multiplexed portion on the substrate in a light propagation direction, wherein in a cross section perpendicular to the light propagation direction, an angle formed between the substrate and a side surface of one optical waveguide, which faces the other optical waveguides, is set to $\alpha$, and an angle formed between the substrate and a side surface of one optical waveguide, which does not face the other optical waveguides, is set to $\beta$, satisfying $\alpha<\beta$, wherein $\alpha\leq90°$, and $\beta\leq90°$. Therefore, light propagating through the at least two optical waveguides tends to propagate between the optical waveguides when approaching the multiplexed portion. As a result, the light transmission loss during multiplexing light can be reduced.

8 Claims, 2 Drawing Sheets

(56) References Cited

U.S. PATENT DOCUMENTS

| | | | | |
|---|---|---|---|---|
| 2004/0105677 | A1* | 6/2004 | Hamada | G02F 1/313<br>398/79 |
| 2007/0297732 | A1* | 12/2007 | Mason | G02B 6/12004<br>385/122 |
| 2013/0259425 | A1* | 10/2013 | Okayama | G02B 6/125<br>385/49 |
| 2022/0326554 | A1* | 10/2022 | Take | G02F 1/035 |
| 2023/0273468 | A1* | 8/2023 | Yao | G02F 1/035<br>385/2 |
| 2023/0400748 | A1* | 12/2023 | Valentine | G02F 1/395 |

* cited by examiner

OPTICAL DEVICE

FIELD OF THE INVENTION

The present invention relates to an optical device.

BACKGROUND OF THE INVENTION

Communication traffic has been remarkably increased with widespread Internet use, and optical fiber communication is becoming significantly important. The optical fiber communication is a technology that converts an electric signal into an optical signal and transmits the optical signal through an optical fiber and has the characteristics of wide bandwidth, low loss, and resistance to noise.

Patent document 1 (JP 2007-114253) discloses a waveguide type light splitting element, which splits the light incident from two input-side optical fibers to multiple output-side optical fibers.

In the light splitting element in patent document 1, the transmission loss is reduced by tilting a sidewall of a coupling waveguide located in a forestage of a multiplexed portion. However, since the sidewalls of the coupling waveguides are both inclined, an optical loss is likely to generate at an outer sidewall during multiplexing light.

CITATION LIST

Patent Document

Patent Document 1: JP 2007-114253.

SUMMARY OF THE INVENTION

The present invention is completed in view of the above problems, and its object is to provide an optical device capable of reducing transmission loss during multiplexing light.

The present application provides an optical device, comprising: a substrate; and at least two optical waveguides formed on the substrate and facing a multiplexed portion on the substrate in a light propagation direction, wherein in a cross section perpendicular to the light propagation direction, an angle formed between the substrate and a side surface of one optical waveguide, which faces the other optical waveguides, is set to $\alpha$, and an angle formed between the substrate and a side surface of one optical waveguide, which does not face the other optical waveguides, is set to $\beta$, satisfying $\alpha<\beta$, wherein $\alpha\leq 90°$, and $\beta\leq 90°$.

In the optical device according to the present invention, in a cross section perpendicular to a light propagation direction, an angle formed between the substrate and a side surface of one optical waveguide, which faces the other optical waveguides, is greater than an angle formed between the substrate and a side surface of one optical waveguide, which does not face the other optical waveguides. As such, light propagating through the at least two optical waveguides tends to propagate between the optical waveguides when approaching the multiplexed portion, thereby an optical loss at an outer side of the waveguide is reduced. As a result, a light transmission loss during multiplexing light can be reduced.

Further, in the optical device according to the present invention, preferably, $\beta$ is 85° or more. As such, the transmission loss at the outer sides of the at least two optical waveguides during multiplexing light can be further suppressed.

Further, in the optical device according to the present invention, preferably, the optical device further comprises a protection layer formed adjacent to the optical waveguides.

Further, in the optical device according to the present invention, preferably, the optical waveguides are formed of an oxide containing lithium.

Further, in the optical device according to the present invention, preferably, the oxide containing lithium is epitaxial lithium niobate or lithium tantalate.

Advantageous Effects of the Invention

The optical device according to the present invention can effectively reduce the light transmission loss during multiplexing light.

DETAILED DESCRIPTION

The optical devices involved in the embodiments will be described below. In the description of each figure, the same or equivalent elements are marked with the same reference number, and sometimes repeated description is omitted.

Embodiment 1

Figure 1:
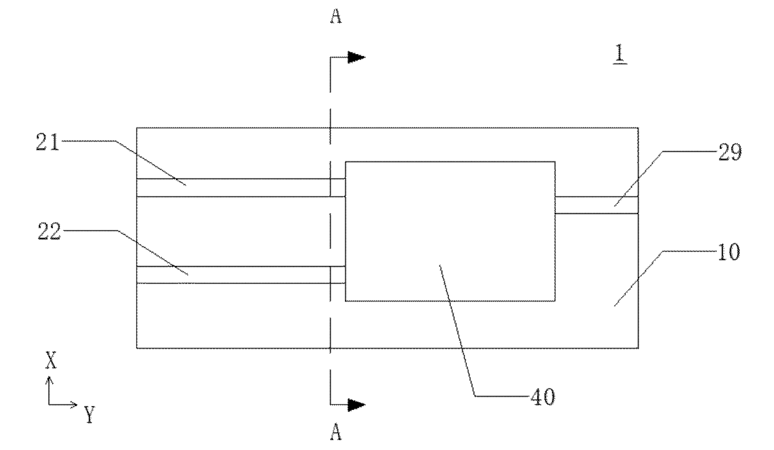
FIG. 1 schematically illustrates a top view of an optical device according to an embodiment of the present invention.
Figure 2:
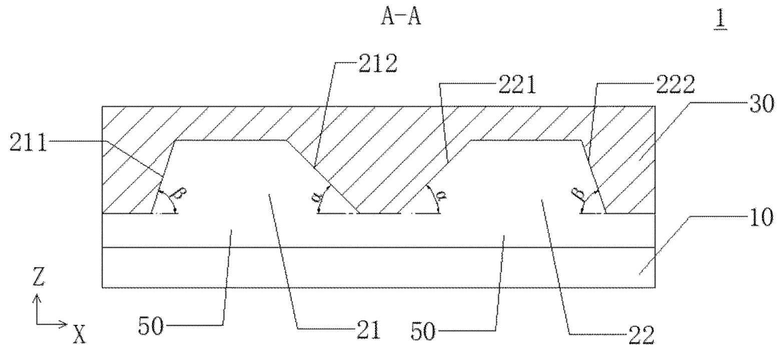
FIG. 2 schematically illustrates a cross-sectional view of an optical device according to an embodiment of the present invention along line A-A of FIG. 1

FIG. 1 schematically illustrates a top view of an optical device according to an embodiment of the present invention. FIG. 2 schematically illustrates a cross-sectional view of an optical device according to an embodiment of the present invention along line A-A of FIG. 1. A light propagation direction is set as Y direction, a thickness direction of the substrate perpendicular to the Y direction is set as Z direction, and a direction perpendicular to both Y and Z directions is set as X direction.

Referring to FIG. 1, the optical device 1 according to embodiment 1 comprises a substrate 10 and two optical waveguides 21, 22 formed on the substrate 10 and facing to a multiplexed portion 40 on the substrate 10 in a light propagation direction, i.e., Y direction. The two optical waveguides 21, 22 are multiplexed to one output optical waveguide 29 through the multiplexed portion 40. Therefore, the light incident from the optical waveguides 21, 22 respectively is multiplexed at the multiplexed portion 40 and outputted from the optical waveguide 29. Here, only one output optical waveguide 29 is illustrated, but it should be understood that multiple output optical waveguides may be arranged. In addition, in this figure, the optical waveguides 21, 22 extend along the Y direction, but they may also extend obliquely or curvedly along an X-Y plane on a main plane of the substrate 10 as needed.

FIG. 2 illustrates the cross-sectional shape of a portion of the optical waveguides 21, 22 close to the multiplexed portion 40. Here, the portion close to the multiplexed portion 40 refers to a portion having a distance less than a predetermined distance to the multiplexed portion along the light propagation direction. The predetermined distance, for example, is 0.5 μm-100 μm. Referring to FIG. 2, in an X-Z cross section perpendicular to the light propagation direction, the optical waveguide 21 has two side surfaces 211 and 212. The side surface 211 does not face the optical waveguide 22, while the side surface 212 faces a side surface 221 of the optical waveguide 22. Similarly, the optical waveguide 22 has two side surfaces 221 and 222. The side surface 222 does not face the optical waveguide 21, while the side surface 221 faces the side surface 212 of the optical waveguide 21. In addition, the optical waveguide 21 and the optical waveguide 22 may further include a slab portion 50 formed thinly parallel to the substrate 10. The slab portion of the optical waveguide 21 and the slab portion of the optical waveguide 22 may be formed integrally.

For the optical waveguide 21, an angle formed between the side surface 212 and the substrate 10 is set to α, and an angle formed between the side surface 211 and the substrate 10 is set to β. Here, α≤90°, and β≤90° is set. Similarly, for the optical waveguide 22, an angle formed between the side surface 221 and the substrate 10 is set to α, and an angle formed between the side surface 222 and the substrate 10 is set to β. In the optical device 1, α<β is satisfied.

In the optical device 1, compared with the side face 211, the side surface 212 of the optical waveguide 21, is formed with a gentler angle with respect to the substrate 10, besides compared with the side surface 222, the side surface 221 of the optical waveguide 22, is formed with a gentler angle with respect to the substrate 10. As such, light propagating through the optical waveguides 21, 22 tends to propagate between the optical waveguides (in an area between the optical waveguide 21 and the optical waveguide 22) when approaching the multiplexed portion 40, thereby an optical loss at outer sides of the optical waveguides 21 and 22 (a side of the side surface 211 and a side of the side surface 222) is reduced. As a result, a light transmission loss during multiplexing light can be reduced.

In this implementation, β is preferably 85° or more. As such, the transmission loss at the outer side surfaces 211, 222 of the optical waveguides 21, 22 can be further suppressed. Here, ideally, it is desired that the β is 90°. From the perspective of manufacturing errors and manufacturing ease, β is preferably 85° or more.

Referring to FIG. 2, the optical device 1 further comprises a protection layer 30 formed adjacent to the optical waveguides 21, 22, 29. The protection layer 30 prevents the light propagating through the optical waveguides 21, 22, 29 from being absorbed by other components of the optical device (such as electrode). Thus, the material of the protection layer 30 may be widely selected as long as the protection layer 30 can function as an intermediate layer between the optical waveguides and signal electrodes and its material is non-metallic. For example, the protective layer 30 may be a ceramic layer made of an insulating material such as metal oxide, metal nitride, or metal carbide. The material of the protective layer 30 can be a crystalline material or an amorphous material. The protective layer 30 is preferably formed of a material with a lower refractive index than the optical waveguide, such as, $Al_2O_3$, $SiO_2$, $LaAlO_3$, $LaYO_3$, ZnO, $HfO_2$, MgO, $Y_2O_3$ etc.

Optical waveguides 21, 22, 29 are not particularly limited as long as they are made of an electro-optical material. The optical waveguides are preferably formed of an oxide containing lithium. The optical waveguides are more preferably composed of epitaxial lithium niobate ($LiNbO_3$) or lithium tantalate ($LiTaO_3$). This is because lithium niobate or lithium tantalate has a large electro-optical constant and is suitable as a constituent material for optical devices such as light modulators. Hereafter, the structure of the present invention will be described below in detail in a case that the optical waveguides 21, 22, 29 are lithium niobate film.

The substrate 10 is not particularly limited as long as it has a lower refractive index than the lithium niobate film, but it is preferable a substrate on which a lithium niobate film can be formed as an epitaxial film, and a sapphire single crystal substrate or a silicon single crystal substrate is preferable. The crystal orientation of the single crystal substrate is not particularly limited. The lithium niobate film has properties such as being easily formed as a c-axis-oriented epitaxial film with respect to single crystal substrates of various crystal orientations. Since the c-axis oriented lithium niobate film has three-fold symmetry, it is desirable that the underlying single crystal substrate also has the same symmetry. In the case of a sapphire single crystal substrate, a c-plane substrate is preferred, and in the case of a silicon single crystal substrate, a (111) plane substrate is preferred.

Here, the epitaxial film is a film oriented in alignment with the crystal orientation of the underlying substrate or underlying film. When the film plane is defined as the XY plane and the film thickness direction is defined as the Z axis, the crystals are aligned and oriented along the X, Y and Z axes. For example, the epitaxial film can be verified by first confirming the intensity at the orientation position by 2θ-θ X-ray diffraction and secondly confirming the pole.

Specifically, first, when measurement is performed by 2θ-θ X-ray diffraction, the peak intensity of all peaks other than the target surface is 10% or less, preferably 5% or less, of the maximum peak intensity of the target surface. For example, in a c-axis oriented epitaxial film of lithium niobate, the peak intensity of planes other than the (00L) plane is 10% or less, preferably 5% or less of the maximum peak intensity of the (00L) plane. (00L) is a generic term for equivalent planes such as (001) and (002).

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNbA_yO_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 303.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film is preferably formed using a film formation method, such as sputtering, CVD or sol-gel process. Application of an electric field in parallel to the c-axis of the lithium niobate that is oriented perpendicular to the main surface of the substrate can change the optical refractive index in proportion to the electric field.

In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a refractive index lower than that of the lithium niobate film and should be suitable for epitaxial growth. As a formation method for the lithium niobate film, there is known a method of thinly polishing or slicing the lithium niobate single crystal substrate. This method has an advantage that characteristics same as those of the single crystal can be obtained and can be applied to the present invention.

Embodiment 2

Figure 3:
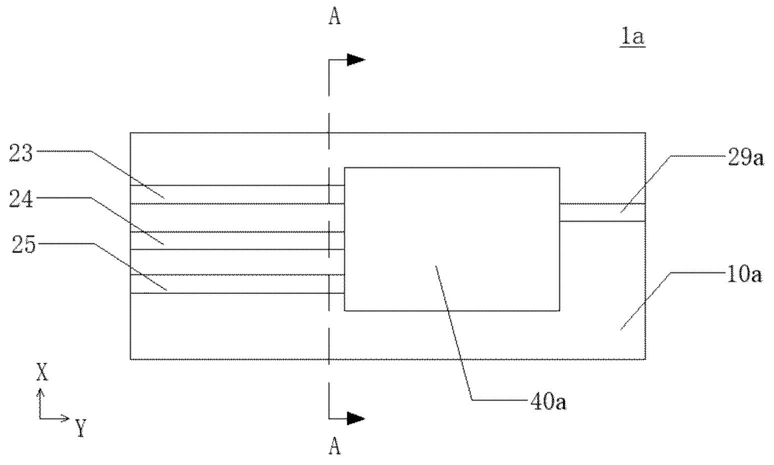
FIG. 3 schematically illustrates a top view of an optical device according to another embodiment of the present invention.
Figure 4:
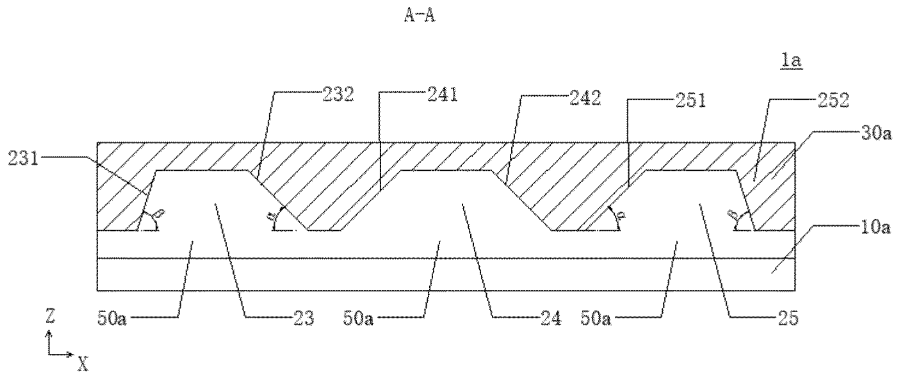
FIG. 4 schematically illustrates a cross-sectional view of an optical device according to another embodiment of the present invention along line A-A.

The difference between embodiment 2 and embodiment 1 is that there are two or more (in this case, three) optical waveguides 23, 24, 25 in embodiment 2. Hereafter, description will be made to the difference between embodiment 1 and embodiment 2. FIG. 3 schematically illustrates a top view of an optical device according to embodiment 2 of the present invention. FIG. 4 schematically illustrates a cross-sectional view of an optical device according to embodiment 2 of the present invention along line A-A.

Referring to FIG. 3, the optical device 1*a* according to embodiment 2 comprises a substrate 10*a* and three optical waveguides 23, 24, 25 formed on the substrate 10*a* and facing to a multiplexed portion 40*a* on the substrate 10*a* in a light propagation direction, i.e., Y direction. The three optical waveguides 23, 24, 25 are multiplexed to one output optical waveguide 29*a* through the multiplexed portion 40*a*. Therefore, the light incident from the optical waveguides 23, 24, 25 respectively is multiplexed at the multiplexed portion 40*a* and outputted from the optical waveguide 29*a*. Here, only one output optical waveguide 29*a* is illustrated, but it should be understood that multiple output optical waveguides may be arranged.

FIG. 4 illustrates the cross-sectional shape of a portion of the optical waveguides 23, 24, 25 close to the multiplexed portion 40*a*. Here, the portion close to the multiplexed portion 40*a* refers to a portion having a distance less than a predetermined distance to the multiplexed portion along the light propagation direction. The predetermined distance, for example, is 0.5 μm-100 μm. Referring to FIG. 4, in an X-Z cross section perpendicular to the light propagation direction, the optical waveguide 23 has two side surfaces 231 and 232. The side surface 231 does not face the optical waveguide 24, while the side surface 232 faces a side surface 241 of the optical waveguide 24. Similarly, the optical waveguide 25 has two side surfaces 251 and 252. The side surface 252 does not face the optical waveguide 24, while the side surface 251 faces the side surface 242 of the optical waveguide 24. The optical waveguide 24 has two side surfaces 241 and 242, and the two side surfaces 241 and 242 face the optical waveguide 23 and the optical waveguide 25 respectively. In addition, the optical waveguide 23, 24, 25 may further include a slab portion 50*a* formed thinly parallel to the substrate 10. The slab portion of the optical waveguide 23, 24, 25 may be formed integrally.

For the optical waveguide 23, an angle formed between the side surface 232 and the substrate 10*a* is set to α, and an angle formed between the side surface 231 and the substrate 10*a* is set to β. Here, α≤90°, and β≤90° is set. Similarly, for the optical waveguide 25, an angle formed between the side surface 251 and the substrate 10*a* is set to α, and an angle formed between the side surface 252 and the substrate 10*a* is set to β. In the optical device 1*a*, α<β is satisfied.

In the optical device 1*a*, compared with the side face 231, the side surface 232 of the optical waveguide 23, is formed with a gentler angle with respect to the substrate 10*a*, besides compared with the side surface 252, the side surface 251 of the optical waveguide 25, is formed with a gentler angle with respect to the substrate 10*a*. As such, light propagating through the optical waveguides 23~25 tends to propagate between the optical waveguides (an area between the optical waveguide 23 and the optical waveguide 25, an area between the optical waveguide 24 and the optical waveguide 25) when approaching the multiplexed portion 40*a*, thereby an optical loss at outer sides of the optical waveguides 23 and 25 (a side of the side surface 231 and a side of the side surface 252) is reduced. As a result, a light transmission loss during multiplexing light can be reduced.

In this implementation, β is preferably 85° or more. As such, the transmission loss at the outer side surfaces 231, 252 of the optical waveguides 23, 25 can be further suppressed.

For the optical waveguide 24, since its two side surfaces 241 and 242 both face to the other optical waveguides 23 and 25, angles formed by the side surfaces 241, 242 and the substrate 10*a* can be set to be equal, i.e., the optical waveguide 24 has an isosceles trapezoidal shape. Alternatively, the angles formed by the side surfaces 241, 242 and the substrate 10*a* may also be set to be unequal.

EXAMPLES

Figure 5:
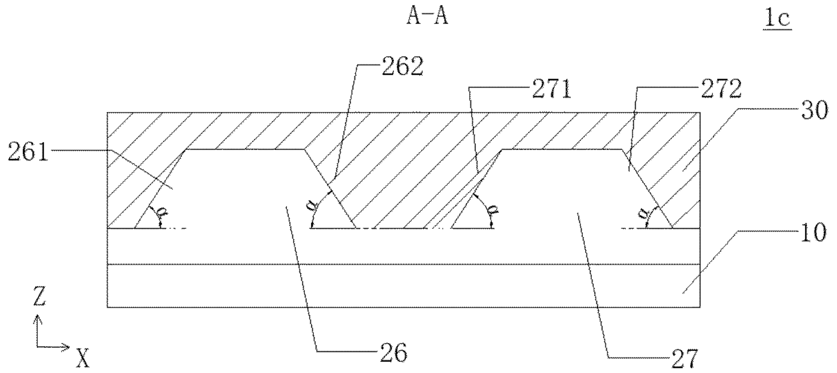
FIG. 5 schematically illustrates a cross-sectional view of an optical device according to a comparative example along line A-A.

Examples 1 and 2 were made according to the structure of the optical device 1 in embodiment 1, while a comparative example was made according to the structure of the optical device illustrated in FIG. 5. The only difference of examples 1, 2 from the comparative example is that the cross-sectional shape of the optical waveguides 21, 22 close to the multiplexed portion is different. In the example 1, the angle α formed by the side surface 212, 221 and the substrate 10 is 71°, and the angle β formed by the side surface 211, 222 and the substrate 10 is approximately 90°. In Embodiment 2, a is 60° (more inclined than Embodiment 1) and β is approximately 90°. In the comparative example, α and β are both 70°.

A transmission loss test of light passing through the multiplexed portion was performed on the examples and the comparative example. The experimental results are as shown in Table 1.

TABLE 1

| | Example 1 | Example 2 | Comparative example |
|---|---|---|---|
| Transmission loss | 1.7 dB | 2.0 dB | 7.0 dB |

From Table 1, it can be seen that according to the comparison between examples 1, 2 and the comparative example, the transmission loss can be significantly reduced, through that the angle α formed by the side surface 212, 221 and the substrate 10 that is less the angle β formed by the side surface 211, 222 and the substrate 10. In addition, according to the comparison between example 1 and example 2, by setting the angle α formed by the side surface 212, 221 and the substrate 10 to be larger, on the one hand, the light can be enabled to propagate well through each optical waveguide 21 and 22, and on the other hand, the light tends to propagate between the optical waveguides when approaching the multiplexed portion, thereby the transmission loss is further reduced.

Although the present invention has been described in detail in conjunction with the embodiments with reference to the drawings, it can be understood that the above description does not limit the present invention in any form. The optical devices of the present invention may include, for example, a directional coupler, a multimode interference coupler, a Y-junction coupler, and various interferometers.

Those skilled in the art can make variations and changes to the present invention as needed without deviating from the substantive spirit and scope of the present invention, all of variations and changes still fall within the scope of protection of the present invention.

REFERENCE NUMERAL

Optical device 1, 1*a*, 1*c*
Substrates 10, 10*a*
Optical waveguide 21-25,26, 27, 29, 29*a*
Side surface of the optical waveguide 211, 212, 221, 222, 231, 232, 241, 242, 251, 252, 261, 262, 271, 272
Slab portion 50, 50*a*
Multiplexed portion 40, 40*a*
Protection layer 30, 30*a*

The invention claimed is:

1. An optical device, comprising:

a substrate; and at least two optical waveguides formed on the substrate and facing a multiplexed portion on the substrate in a light propagation direction, wherein in a cross section perpendicular to the light propagation direction, an angle formed between the substrate and a side surface of one optical waveguide, which faces the other optical waveguides, is set to α, and an angle formed between the substrate and a side surface of one optical waveguide, which does not face the other optical waveguides, is set to β, satisfying $\alpha<\beta$, wherein $\alpha\leq 90°$, and $\beta\leq 90°$.

2. The optical device according to claim 1, wherein β is 85° or more.

3. The optical device according to claim 1, wherein the optical device further comprises a protection layer formed adjacent to the optical waveguides.

4. The optical device according to claim 1, wherein the optical waveguides are formed of an oxide containing lithium.

5. The optical device according to claim 4, wherein the oxide containing lithium is epitaxial lithium niobate or lithium tantalate.

6. The optical device of claim 1, further comprising a multiplexed portion, wherein a transmission loss of light passing through the multiplexed portion is 2.0 dB or less.

7. An optical device, comprising:

a substrate; and at least two optical waveguides formed on the substrate and facing a multiplexed portion on the substrate in a light propagation direction, wherein the at least two optical waveguides comprise a first optical waveguide and a second optical waveguide, the first optical waveguide being adjacent to the second optical waveguide, the first optical waveguide and the second optical waveguide are each configured to be multiplexed at the multiplexed portion, a first surface of the first optical waveguide faces a first surface of the second optical waveguide, a second surface of the first optical waveguide faces away from a second surface of the second optical waveguide, and in a cross section perpendicular to the light propagation direction, an angle formed between the substrate and the first surface of either the first optical waveguide or the second optical waveguide, is set to α, and an angle formed between the substrate and the second surface of either the first optical waveguide and the second optical waveguide, is set to β, satisfying $\alpha<\beta$, wherein $\alpha\leq 90°$, and $\beta\leq 90°$.

8. The optical device of claim 7, further comprising a multiplexed portion, wherein a transmission loss of light passing through the multiplexed portion is 2.0 dB or less.

* * * * *